United States Patent [19]

Guarnieri

[11] Patent Number: 4,521,442

[45] Date of Patent: Jun. 4, 1985

[54] RADIANT ENERGY COLLECTOR HAVING PLASMA-TEXTURED POLYIMIDE EXPOSED SURFACE

[75] Inventor: C. Richard Guarnieri, Somers, N.Y.

[73] Assignee: International Business Machines Corporation, Armonk, N.Y.

[21] Appl. No.: 608,467

[22] Filed: May 9, 1984

Related U.S. Application Data

[62] Division of Ser. No. 393,952, Jun. 30, 1982, Pat. No. 4,478,209.

[51] Int. Cl.$^3$ ............................ F24J 3/02; B05D 3/14
[52] U.S. Cl. ...................................... 427/38; 126/417; 126/901; 156/643
[58] Field of Search ........................... 427/38, 39, 40; 126/417, 901; 156/643

[56] References Cited

U.S. PATENT DOCUMENTS

| | | | |
|---|---|---|---|
| 3,810,777 | 5/1974 | Boebel et al. | 126/901 |
| 4,005,698 | 2/1977 | Cuomo et al. | 427/162 |
| 4,160,045 | 7/1979 | Longshore | 427/38 |
| 4,233,107 | 11/1980 | Johnson | 126/901 |
| 4,235,226 | 11/1980 | Scherber et al. | 126/901 |
| 4,252,865 | 2/1981 | Gilbert et al. | 126/901 |
| 4,357,369 | 11/1982 | Kilichowski et al. | 427/38 |
| 4,440,606 | 4/1984 | Powers et al. | 126/901 |
| 4,448,487 | 5/1984 | Cuomo et al. | 126/901 |
| 4,478,209 | 10/1984 | Guarnieri et al. | 126/417 |

OTHER PUBLICATIONS

Kemlage et al., "IBM Tech. Disc. Bull.," vol. 19, No. 9, Feb. 1977, pp. 3378–3379.

*Primary Examiner*—John H. Newsome
*Attorney, Agent, or Firm*—Scully, Scott, Murphy & Presser

[57] ABSTRACT

A method of fabricating a radiant energy collector is disclosed wherein a substrate is coated on at least a portion of the surface to be exposed to radiant energy, with polyimide then surface-textured employing known procedures, e.g., plasma etching, reactive ion etching or a combination of these techniques, to impart to the coated surface high absorptivity and low emissivity for radiant energy.

14 Claims, No Drawings

RADIANT ENERGY COLLECTOR HAVING PLASMA-TEXTURED POLYIMIDE EXPOSED SURFACE

This is a divisional of copending application Ser. No. 383,952, filed on June 30, 1982 now U.S. Pat. No. 4,478,209.

TECHNICAL FIELD

This invention relates to the conversion of incident radiant energy to thermal energy and, more particularly, to solar energy collectors characterized by high absorption for ultraviolet and visible light and low emissivity for infrared radiation.

BACKGROUND ART

One well known approach to the conversion of solar radiation to more directly useful forms of energy utilizes a large area collector, frequently black on its exposed surface to increase absorbtion of radiation, in contact with a circulating fluid such as water. Solar radiation falling upon the collector which is often shaped as a tube or flat panel, is absorbed therein in the form of heat, the heat being transferred to the circulating fluid.

In accordance with U.S. Pat. No. 4,088,547, a solar collector is made by growing copper dentrites electrolytically on a metal substrate, for example, a copper tube, plating the dentritic surfaces with smooth copper and then plating the smooth copper-coated dendritic surfaces with a black heat absorbing coating such as black nickel or black chrome. U.S. Pat. No. 4,148,294 describes a solar collector panel made by anodizing aluminum or aluminum alloy substrate in an aqueous electrolyte until a porous oxide layer having pores in the sub-micron range is formed and by thereafter galvanically depositing microscopic elongated metal bodies, such as nickel rods, in the pores by making the substrate an electrode in an aqueous solution containing appropriate metal ions, such as nickel ions. U.S. Pat. No. 4,005,698 describes a photon energy converter which traps incident solar energy in a geometric maze whose microstructure can be analogized to the geometric configuration of an acoustic anechoic surface. The optical photon absorber surface consists of a dense forest of aligned needles, e.g., of tungsten, of dimensions of the order of visible wavelengths with a spacing between such needles of the order of several wavelengths of visible light. Such a surface is believed to absorb with a high efficiency because of multiple reflections occurring as the incident photons penetrate the needle maze in a manner similar to that in which absorption takes place in an anechoic chamber because of multiple reflections of sound.

Due to the relatively high cost of the materials and/or fabricating techniques required to provide solar collectors of the foregoing types, their prospects for widespread use are limited.

Synthetic resins which are readily thermoformable into a variety of shapes have been widely investigated as suitable materials for the manufacture of low cost solar collectors. Some commercially available varieties are inexpensive for appropriate strengths, are acceptably resistant to ultraviolet degradation and have high absorptivity for visible light but unlike the dendridic surfaces of the solar collectors described above, generally do not possess suitably low emissivity characteristics in the infrared region (i.e., 5–10 microns). The texturizing, or etching, of polymer surfaces to modify their electrical, thermal and/or chemical properties is a known technique and has been practiced, particularly for electronic applications. U.S. Pat. Nos. 4,064,030 and 4,155,826 each describes molded fluorine resin articles whose exterior surfaces have been roughened by sputter etching in vacuum or inert gas. Such surface treatment renders the articles more adherent to materials such as adhesives, paints or inks applied thereto. U.S. Pat. No. 4,092,442 discloses a plasma-etched polyimide mask which is used in processes using either positive or negative electron beam lithography which require sensitive resists. According to U.S. Pat. No. 4,229,233, plasma etching with oxygen has been used to reduce the reflectivity of semiconductor substrates, primarily silicon, from which photovoltaic cells are fabricated. Plasma-etched thin film protective coatings, e.g., of polyimide, for sensitive electronic devices such as integrated circuits are known (viz., DuPont descriptive literature for the Pyraline polyimide coatings). Heretofore, the texturizing of a thin film resin coating to improve the absorption and emission characteristics of a solar collector has not been described.

SUMMARY OF THE INVENTION

In accordance with the present invention, a radiant energy collector is provided with is comprised of a substrate coated on at least those surfaces exposed to radiant energy with a thin film of polyimide resin which has been surface-texturized to impart to said coated substrate high absorption and low emissivity for radiant energy.

DESCRIPTION OF THE PREFERRED EMBODIMENTS

A wide variety of substrates can be utilized in the practice of this invention, e.g., metals and metal alloys such as aluminum, copper, steel, Nichrome (Driver-Harris Co.), magnalium, etc., glassy metals such as those of the Metglas series (Allied Chemical Corp.), ceramics and glasses of all types, composite materials including cermets, and numerous synthetic resins such as polyethylene, polypropylene, polyethylene-propylene copolymer, polyvinyl chloride, polybutylene terephthalate, polyamide, etc. Due to their relatively low cost, readily availability and ease of formability into a variety of configurations, common commercial grades of aluminum are an especially preferred type of metal which can serve as the substrate for the polyimide coating herein. Carbon black-filled polybutylene terephthalate is a preferred resin for constructing a radiant energy collector in accordance with this invention and is commercially available in the form of panels of tubes in parallel array. The substrate regardless of type can be provided in any number of shapes: in addition to the more common flat panel and tubular configurations, the substrates can assume a variety of curves, e.g. circular, parabolic, etc., as desired using known fabrication techniques.

While water will generally be employed as the working fluid of the radiant energy collector, other fluids can be used, e.g., ethylene glycol, ethylene glycol-water solutions, and halogenated hydrocarbons which are liquid at the operating temperature of the collector. Suitable polyimides which can be used to coat the substrate are commercially available, e.g., Vespel and the Pyralin series of resins, both from DuPont. The aromatic polyimides are preferred and are typically prepared by reacting aromatic dianhydrides with aromatic diamines in a polar solvent such as dimethylformamide, dimethylacetamide, dimethylsulfoxide, N-methylpyrrolidone, metacresol, and the like, at below 50° C. to prevent cyclization and to provide a solution of poly(amic acid). Heating of the solution of poly(amic acid) evaporates the solvent and results in imidization to provide the polyimide resin. These reactions, formation of poly(amic acid) and subsequent imidization, can be illustrated for a preferred aromatic polyimide, i.e., one based on the reaction of pyromellitic dinhydride and 4,4'-diaminodiphenyl ether, as follows:

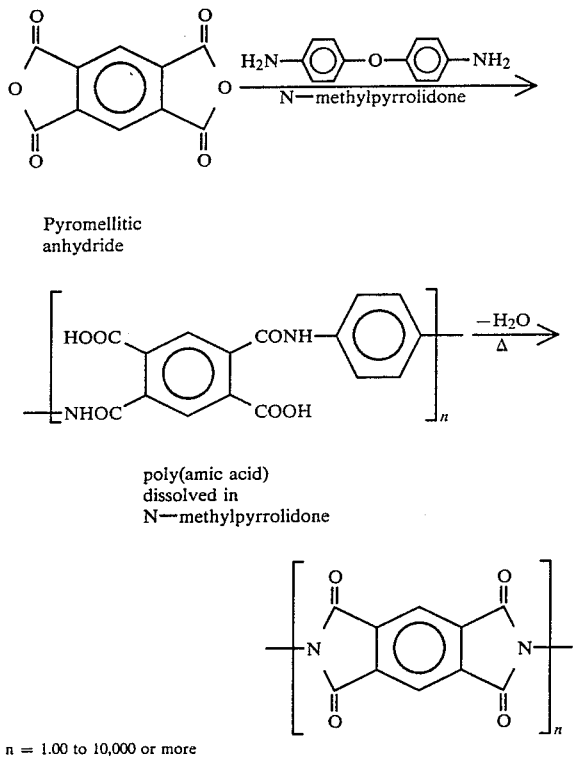

Pyromellitic anhydride poly(amic acid) dissolved in N—methylpyrrolidone n = 1.00 to 10,000 or more It is to be understood that the foregoing reactions and resulting polyimide are merely representative: other preparative procedures and polyimides including copolyimides, which are useful in the practice of this invention are described in the *Encyclopedia of Polymer Science and Technology*, Vol. 11, pp. 247–272, John Wiley & Sons, Inc. (1969) and Kirk-Othmer, *Encyclopedia of Chemical Technology*, 3rd Ed., Vo. 18, pp. 704–719 (1982), the disclosures of which are incorporated by reference herein. It is also within the scope of this invention to incorporate finely divided materials, e.g., metals, into the polyimide for the purpose of further increasing absorptivity and/or reducing emissivity for radiant energy especially solar radiation. Thus, for example, a metal salt such as silver acetate can be added to a solution of poly(amic acid) to form the corresponding salt of the poly(amic acid). Imidization of the poly(amic acid salt) results in the formation of polyimide containing microscopic particles of the metal uniformly dispersed therein. For a further description of this technique, reference is made to U.S. Pat. No. 3,073,785 the disclosure of which is incorporated by reference herein.

The polyimide is preferably applied to the substrate of choice in the form of a solvent solution of its precursor poly(amic acid), e.g., by spraying on a stationary or rapidly spinning substrate, followed by conversion of poly(amic acid) to polyimide employing thermal or chemical means as described in the *Encyclopedia of Polymer Science and Technology* referred to above. The thickness of the polyimide film can vary widely and in general will range from about 5,000 to about 500,000 Angstrom units (A); preferably from about 10,000 A to about 100,000 A. The polyimide coating can be texturized by procedures which are known in the art to provide a dendridic-like surface in which the average height of the dendrite-like projections of "needles" will vary from about 200 A to about 10,000 A, preferably from about 1,000 A to about 4,000 A with the centers of the needles being separated by an average distance of from about 300 A to about 10,000 A, preferably from about 1,000 A to about 3,000 A, said ranges of average distance between centers corresponding to an approximate density of needles in the broad range of from about $1.0 \times 10^{11}$ per cm$^2$ to about $1.0 \times 10^8$ per cm and in the preferred range of from about $1.0 \times 10^{10}$ per cm$^2$ to about $1.0 \times 10^9$ per cm$^2$.

The preferred surface-texturizing techniques herein are the plasma etching and reactive ion etching procedures described in U.S. Pat. No. 4,229,233, the disclosure of which is incorporated by reference herein. Plasma etching involves the chemical combination of the surface of a material to be etched, in the present case polyimide, with a gaseous species produced in a discharge which in a preferred embodiment is oxygen with or without some other reactive gas such as chlorine, carbon tetrachloride, carbon tetrafluoride and similar halocarbon-based gases. Reactive ion etching, which is preferred, subjects the surface of the polyimide to both physical sputtering as well as a chemical reaction with the gaseous species. A diode, triode or magnetron configured chamber can be used to carry out the foregoing procedures. The resulting surface texturized polyimide will appear black and velvet-like to the naked eye.

Selection of operating conditions for both plasma etching and reactive ion etching which will provide a suitably surface-texturized polyimide coated substrate in accordance with this invention can be readily and conveniently selected by those skilled in the art, reference once again being made to U.S. Pat. No. 4,229,233 for a detailed disclosure of such conditions which will provide good results herein.

While the present invention is especially adapted for use in connection with the absorption of the ultra-violet and visible portions of the solar radiation spectrum, i.e., for wavelengths from about 2,000 to about 4,000 A and from about 4,000 to about 7,000 A, respectively, it will be understood that the invention can also be used for absorbing wavelengths of radiation in the foregoing ranges emitted by sources other than the sun. Moreover, by appropriate regulation of the conditions under which surface texturizing of the polyimide layer is carried out, the absorption properties of this layer can be such that wavelengths of radiant energy below the UV range (the lower practical limit of which is established by the degree of atmospheric absorption) or above the visible range can also be absorbed by the radiant energy collector of the present invention. For example, as the wavelength of the radiant energy whose absorption is desired increases, the average height of the needle-like projections formed in the polyimide layer and the average distance between their centers should increase by an approximately proportionate distance. This can be achieved by appropriately adjusting gas pressure, voltage and residence time in the etching chamber, optimum level of which for a given surface-texturizing development can be established by routine testing employing known and conventional procedures.

The following example is further illustrative of the present invention as applied to the fabrication of a solar energy collector.

EXAMPLE

A. Coating Substrate

A square aluminum plate of 10 cm$^2$ and 0.10 cm thickness is coated with a 30–35 weight % solution in N-methylpyrrolidone of poly(amic acid) derived from the reaction of pyromellitic anhydride and 4,4'-diaminodiphenyl ether to an average thickness (when dry) of approximately 10,000 A. Following evaporation of the N-methylpyrrolidone, the poly(amic acid)-coated substrate is heated to 250° C. and maintained at about this temperature for about 3 hours to convert the poly(amic acid) to the corresponding polyimide.

B. Surface-Texturizing

A planar diode-type reactor chamber such as described in U.S. Pat. No. 4,229,233 is evacuated to a pressure of about 80 mtorr and ambient air as the source of reactive oxygen is introduced to the chamber at about 105 cc/min. The electrode holding the polyimide-coated aluminum plate is driven at about 800 volts for 10 minutes. Following venting of the system, the surface-textured polyimide-coated aluminum plate is removed from the reactor chamber and inspected by scanning electron microscopy (SEM). The surface of the polyimide coating is observed to contain needle shaped projections approximately 2,000 A in average height with an average spacing between centers of approximately 7,000 A. The texturized surface absorbs over 95% of visible light when the angle of incidence of the light is normal to the plane of the collector and emissivity at 2 microns wavelength is less than 0.8.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for imparting increased absorptivity and reduced emissivity for radiant energy of a material which comprises coating said material on at least a portion of the surface thereof exposed to radiant energy with polyimide and surface texturizing said polyimide whereby the polyimide coated material exhibits increased absorptivity and reduced emissivity for radiant energy.

2. The method of claim 1 wherein a material selected from the group consisting of aluminum and polybutylene terephthalate is coated with said polyimide.

3. The method of claim 1 wherein the polyimide is an aromatic polyimide.

4. The method of claim 1 wherein the polyimide is obtained from the reaction of pyromellitic dianhydride and 4,4'-diaminodiphenyl ether.

5. The method of claim 1 wherein the polyimide is applied to the material to an average thickness of from about 5,000 A to about 500,000 A.

6. The method of claim 1 wherein the polyimide is applied to the material to an average thickness of from about 10,000 A to about 100,000 A.

7. The method of claim 1 wherein the polyimide is applied to the material as a solvent solution of its poly(amic acid) precursor, said precursor thereafter being thermally or chemically cured to provide the polyimide.

8. The method of claim 7 wherein there is added to said solvent solution of poly(amic acid) precursor a metal salt thereby forming the corresponding metal salt of the poly(amic acid), said metal salt of poly(amic acid) providing, upon curing, polyimide have finely divided particles of the metal originally present in said metal salt distributed therein, said metal particles increasing absorptivity and/or reducing emissivity for radiant energy.

9. The method of claim 1 wherein surface texturizing of the polyimide is effected by plasma etching, reactive ion etching or combination thereof.

10. The method of claim 9 wherein the etching is carried out in the presence of oxygen or an oxygen-containing gas.

11. The method of claim 9 wherein the plasma etching and/or reactive ion etching is carried out in a reactor chamber operated in the diode, triode and/or magnetron configuration.

12. The method of claim 1 wherein the surface-texturized polyimide coating appears as needle-like projections having an average height of from about 200 A to about 10,000 A, an average distance between the centers of adjacent projections of from about 300 A to about 10,000 A and an average density of from about $1.0 \times 10^{11}$ to about $1.0 \times 10^8$ projections per cm$^2$.

13. The method of claim 1 wherein the surface-texturized polyimide coating appears as needle-like projections having an average height of from about 1,000 A to about 4,000 A, an average distance between the centers of adjacent projections of from about 1,000 A to about 3,000 A and an average density of from about $1.0 \times 10^{11}$ to about $1.0 \times 10^9$ projections per cm$^2$.

14. The method of claim 1 wherein the material is coated on at least a portion of the surface thereof exposed to radiant energy with an aromatic polyimide coating to an average thickness of from about 5,000 A to about 500,000 A, the exposed surface of said aromatic polyimide coating being texturized by plasma etching, reactive ion etching or combination thereof to present needle-like projections having an average height of from about 200 A to about 10,000 A, an average distance between the centers of adjacent projections of from about 300 A to about 10,000 A and an average density of from about $1.0 \times 10^{11}$ to about $1.0 \times 10^8$ projections per cm$^2$, said coated material absorbing at least about 95% of the radiation when the angle of incidence of said radiation is normal to the plane of the collector and emitting radiation at 2 microns wavelength of less than about 0.8.

* * * * *